April 22, 1941.  E. H. THORESEN  2,239,174
HANDLE LUG FOR BURIAL CONTAINERS
Filed Aug. 11, 1939
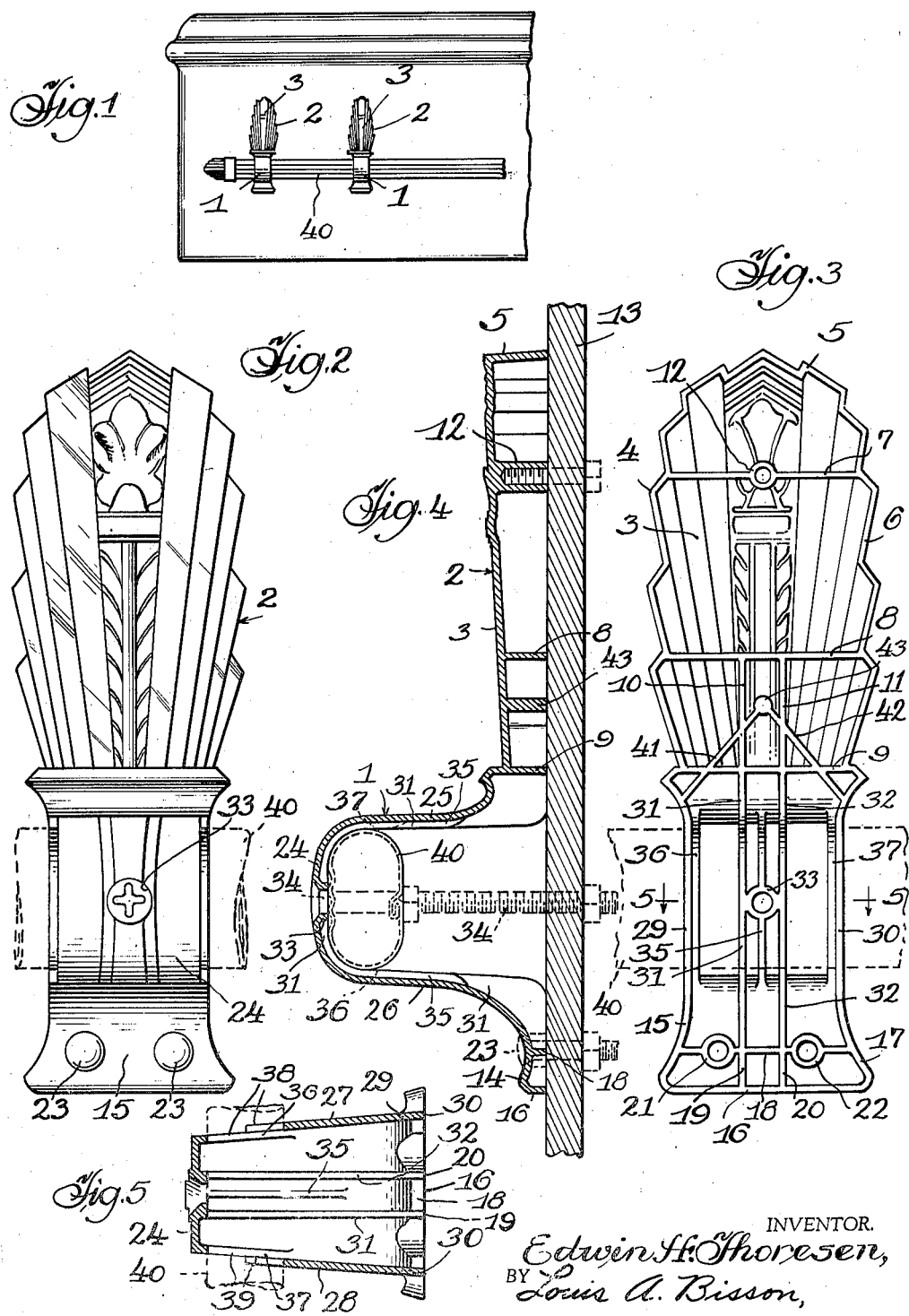
INVENTOR.
Edwin H. Thoresen,
BY Louis A. Bisson,
ATTORNEY.

Patented Apr. 22, 1941

2,239,174

UNITED STATES PATENT OFFICE 2,239,174

HANDLE LUG FOR BURIAL CONTAINERS

Edwin H. Thoresen, Chicago, Ill., assignor to William Thoresen Company, Chicago, Ill., a corporation of Illinois Application August 11, 1939, Serial No. 289,531

1 Claim. (Cl. 16—111)

The present invention relates to casket hardware, and more particularly to the lugs of the handle devices used on burial containers, such as caskets, coffins, and the like.

Heretofore it has been customary to make these lugs of metal, usually cast metal and sheet metal. Such lugs are heavy, costly to make, require machining, and also require finishing operations to make them attractive. No one has previously been successful in making such lugs of substitute material, except in the case of where I disclose in my copending application, Serial No. 208,745, filed May 19, 1938, the making of lugs of plastic material.

The present invention comprehends the idea of making these lugs of thermoplastic material. If these lugs were made of such material and in the form heretofore made when made of metal, they would be very weak and would readily break or fracture under the usual weight to which they would be subjected in use. I have discovered, after some experimentation, that I can successfully use such material as a thermoplastic substance as would ordinarily not answer the purpose, and that discovery includes the idea of making the lug in the form of a hollow unit composed of a hollow, contoured body or nub portion and an integral back or base portion, together with a common perimetral flange and with integral, spaced webs or ribs also connected together so as to give the unit structure great strength. The unit is composed of a series or an aggregate of cellular portions, each with border and web portions integral with and extending from the contoured face portions of the unit. In other words, the unit is composed of a group of strong and rigid cellular or honey-combed minor units which give to the unit as a whole the strength and rigidity that could only be otherwise secured by the use of entirely different materials in entirely different forms. The contouring of the body portion and the base portion gives strength, and the employment additionally of the border and web portions furnishes further strength and rigidity.

The thermoplastic I preferably use is that known in the trade under the trade name "Tenite." It is basically a cellulose acetate obtained from a cellulose ester. It may be cast or molded to any desired form by the compression molding process or the injection molding process. The mold surfaces are preferably smooth and polished so that the casting when released from the mold has its final desired finish without any necessity of any finishing operation, thus greatly reducing the cost of production.

In the case of my invention, I prefer to cast the lugs by the injection molding process wherein the material which is initially in granular or powder form is fused as at about 360° F. to 370° F., or even as high as 385° F., depending upon the degree of color pigments that may be contained in the substance, and is then injected in liquid form under a pressure from about 10,000 to 20,000 pounds per square inch rapidly into the mold so as to fill all cavities in about or less than one second of time. The mold is already cooled or cold so that the thermoplastic will start to set upon injection, and will be fully set in about two or three seconds of time. This method gives for a more rapid and cheaper production than by the compression molding method, which would involve the several steps (a) of placing the substance or pieces of the substance in the open mold, (b) of heating the mold, (c) of closing the mold and applying pressure, (d) of cooling the mold while maintaining the pressure, (e) of releasing the pressure, (f) of opening the mold, and (g) of ejecting the piece.

Other objects, advantages, capabilities, features, and the like, are comprehended by the invention as will later appear and as are inherently possessed by the invention.

Referring to the drawing:

Fig. 1 is a fragmentary view in elevation of a casket showing the application of the invention;

Fig. 2 is a front view in elevation of a novel lug constructed in accordance with the invention;

Fig. 3 is a rear view in elevation of the same;

Fig. 4 is a vertical sectional view taken through the wall of the casket and the lug; and Fig. 5 is a horizontal sectional view taken in a plane represented by line 5—5 of Fig. 3.

Referring more in detail to the drawing, the illustrative lug is a casting of plastic material, preferably thermoplastic material, such as a cellulose acetate. It comprises a deep, hollow body or nub portion 1 and a shallow, hollow back or base portion 2 extending mainly upwardly and partly downwardly from the body portion. The upper part of the base portion 2 comprises a designed and contoured face part 3 from which rearwardly extend at its perimeter, marginal flanges 4, 5 and 6. Interiorly are provided integral, transverse webs or ribs 7, 8 and 9, and also interiorly are provided longitudinal webs or ribs 10 and 11 between the webs 8 and 9. An integral bolt or screw socket 12 is located for the reception of a bolt or screw passing through the wall 13 of the casket, this socket also being integral with the web 7. The short lower base portion has a face part 14 with marginal flanges 15, 16 and 17, and also with integral webs or ribs 18, 19 and 20. Integral with the face part 14 and the web 18 are screw or bolt sockets 21 and 22 through which pass screws or bolts 23, which extend through the wall 13, as shown in Fig. 4.

The body portion 1 has a curved face part 24, upper and lower rearwardly flaring wall parts 25 and 26, of which the former is integral with the web 9 and the lower end of the base face part 3, and of which the latter is integral with the base face part 14, and also side wall portions 27 and 28 (Fig. 5) ending in flange portions 29 and 30 integral with the flange portions 4 and 15, and 6 and 17 (Fig. 3). Within the body portion 1 are integrally formed webs or ribs 31 and 32 which are continuations of the webs 10 and 11, and 19 and 20, and which follow the contour of the wall parts 25, 24 and 26. The face part 24 has an integral socket 33 for the passage of a bolt or screw 34 which extends through the casket wall 13 (Fig. 4).

The body 1 is also provided with further reinforcing, longitudinal ribs or webs 35, 36 and 37, of which the web 35 is medially disposed and is integral with the socket 33, and which also extends at both ends a substantial distance along the inner faces of the walls 35 and 36, and of which webs 36 and 37 are disposed at the sides of the side walls 27 and 28 to reinforce the same at the holes 38 and 39 provided in the side walls 27 and 28, the ends of the webs 36 and 37 extending part way along the inner faces of the walls 25 and 26, as well as also adjacent the side walls 27 and 28.

The edges of the perimetral flange 4—5—6—15—16—17—29—30 are disposed in a common plane so as to lie flush with or squarely upon the outer surface of the casket side wall 13. The transverse webs 7, 8, 9 and 18 and also the longitudinal web parts 10, 11, 19 and 20 all may have, but not necessarily, their edges in the same plane.

The side walls 25 and 26 near the face part 24 are provided with openings 38 and 39 through which extends the hand bar 40 which may be of hollow tubular form. At suitable points the hand bar 40 is apertured for the passage of the bolt or screw 34. The bar contacts with the edges of the openings 38 and 39 and also with the edges of the webs or ribs 31, 32, 35, 36 and 37, and the socket 33, so that the lifting stresses of the bar will be distributively transmitted to all the parts mentioned.

The juncture between the body portion 1 and the base portion 2 is further strengthened by the provision of an integral arch in the form of oblique webs or ribs 41 and 42, with their base ends integral with the flanges 29 and 30 and their peak ends integral with a boss 43 integral with a face part of the base portion 2. Also the webs 41 and 42 are integral with the webs 9, 10, and 11 (Fig. 3). The edges of the webs 41 and 42 and the end of the boss 43 also may be in the plane of the edges of the perimetral flange of the device.

From the above, it is apparent that the face and wall parts, together with the flanges and webs, form a series or an aggregate of strong cells or cellular units giving as a whole great strength to the unit structure, as, for example, the upper portion of the face part 3, together with the web 7, the flange 5 and the upper portions of the flanges 4 and 6 constitute a component cell. The next portion of the face part 3 with the webs 7 and 8 and portions of the flanges 4 and 6 form another component cell; etc. The body portion 1 with its side walls 25 and 26, its flange portions 29 and 30, and the curved web or ribs 31, 32, 35, 36 and 37 all form another rigid cell unit.

While I have herein described and upon the drawing shown an illustrative embodiment of the invention, it is to be understood that the invention is not limited thereto, but comprehends other constructions, arrangements of parts, details, features, and the like, without departing from the spirit of the invention.

Having thus disclosed the invention, I claim:

A handle lug structure for burial containers, and which has a handle bar; comprising a hollow unit composed of integral molded thermoplastic material provided with a hollow base portion having perimetral flanges to seat against the wall of the container, and a hollow lug portion extending from the base portion and having spaced side walls which at the base of the lug portion form integral continuations with the perimetral flanges at the sides of the base portion, the lug portion having upper and lower juncture portions integral with the base portion, said side walls being provided with alined holes for the extension of the handle bar therethrough and through the lug portion, said lug portion and the upper and lower juncture portions between said lug and base portions having on the inside thereof a plurality of spaced substantially parallel reinforcing ribs disposed in horizontally spaced vertical planes and over the handle bar for sustaining the weight stress upwardly imposed upon the structure by the handle bar, said ribs bearing against the handle bar, the ribs being extended inwardly to a plane common to the periphery of the hole in the wall and extending to the base portion at said junctures, and certain of said ribs having extended portions integral with the base portion beyond the said junctures, whereby the lifting stress is sustained by the ribs and side walls.

EDWIN H. THORESEN.